US011937133B2

(12) United States Patent
Marupaduga et al.

(10) Patent No.: US 11,937,133 B2
(45) Date of Patent: Mar. 19, 2024

(54) OPTIMIZING LAYER ASSIGNMENT DURING EPS FALLBACK PROCEDURES

(71) Applicant: T-Mobile Innovations LLC, Overland Park, KS (US)

(72) Inventors: Sreekar Marupaduga, Overland Park, KS (US); Roopesh Kumar Polaganga, Bothell, WA (US)

(73) Assignee: T-Mobile Innovations LLC, Overland Park, KS (US)

( * ) Notice: Subject to any disclaimer, the term of this patent is extended or adjusted under 35 U.S.C. 154(b) by 176 days.

(21) Appl. No.: 17/558,270

(22) Filed: Dec. 21, 2021

(65) Prior Publication Data
US 2023/0199574 A1 Jun. 22, 2023

(51) Int. Cl.
| | |
|---|---|
| *H04W 36/00* | (2009.01) |
| *H04W 8/22* | (2009.01) |
| *H04W 24/02* | (2009.01) |
| *H04W 28/082* | (2023.01) |
| *H04W 72/044* | (2023.01) |
| *H04W 76/16* | (2018.01) |

(52) U.S. Cl.
CPC ......... *H04W 36/0022* (2013.01); *H04W 8/22* (2013.01); *H04W 24/02* (2013.01); *H04W 28/082* (2023.05); *H04W 36/0069* (2018.08); *H04W 72/044* (2013.01); *H04W 76/16* (2018.02)

(58) Field of Classification Search
None
See application file for complete search history.

(56) References Cited

U.S. PATENT DOCUMENTS

| | | | |
|---|---|---|---|
| 11,019,183 B2 * | 5/2021 | Alam | H04L 12/5692 |
| 11,683,728 B2 * | 6/2023 | Akdeniz | H04W 24/10 |
| | | | 370/331 |
| 2020/0314702 A1 * | 10/2020 | Rahman | H04W 36/0033 |

FOREIGN PATENT DOCUMENTS

| | | | | |
|---|---|---|---|---|
| WO | WO-2009149600 A1 * | 12/2009 | ......... | H04L 41/0803 |
| WO | WO-2014068465 A1 * | 5/2014 | ............ | H04W 60/02 |
| WO | WO-2019097498 A1 * | 5/2019 | | |

* cited by examiner

*Primary Examiner* — Gerald A Smarth
(74) *Attorney, Agent, or Firm* — Shook, Hardy, & Bacon L.L.P.

(57) ABSTRACT

Systems and methods are provided for optimizing layer assignment to UEs that are currently on an LTE network, or that are experiencing EPS fallback and are moving from 5G to LTE. Instead of blindly assigning a UE an LTE layer or assigning the same layer to all UEs, aspects provided for an intelligent and dynamic selection of an LTE layer for each UE. The network may analyze one or both of layer compatibility information and historical data associated with the UEs. With this information, the network assigns an LTE layer to each UE.

18 Claims, 5 Drawing Sheets

OPTIMIZING LAYER ASSIGNMENT DURING EPS FALLBACK PROCEDURES

SUMMARY

The present disclosure is directed, in part, to optimizing layer assignment either proactively prior to EPS fallback, or during a current voice session. A network component monitors the UE load on the various layers of a wireless access technology. Once the UE load is above a threshold level, layer capability information and/or historical data associated with each UE is analyzed to determine which layer to assign to each UE. Instead of blindly assigning layers, or assigning the same layer to every UE, whether the UE is experiencing EPS fallback or is already in a voice session, aspects provided herein allow for a dynamic and optimal selection of a layer for UEs. This causes a better user experience because of increased coverage and higher throughput for the UEs.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein.

DETAILED DESCRIPTION

Figure 1:
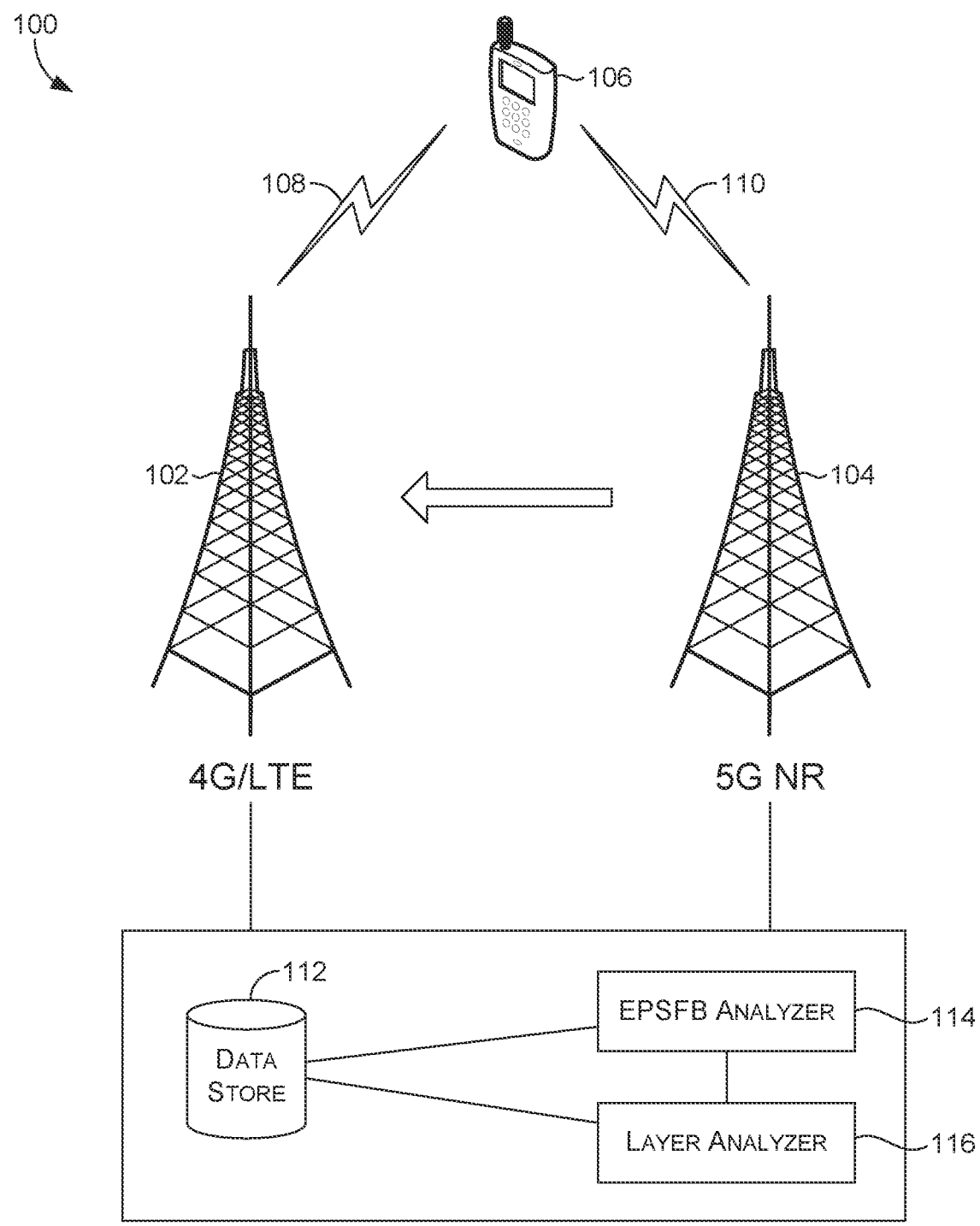
FIG. 1 depicts a diagram of an exemplary computing environment suitable for use in implementations of the present disclosure.

The subject matter in aspects is provided with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

By way of background, handovers commonly occur in geographic areas where two or more wireless access technologies are available, such as LTE and 5G. For example, when a UE moves to an area where the 5G signal is poor, a coverage-based handover may be needed. In this case, the UE may handover to the LTE network. EPS fallback, also referred to herein as EPSFB, is one way that a UE may handover from 5G to LTE. Generally, EPSFB occurs when a UE falls back from 5G to LTE during call establishment. This may be needed, for example, when not all features for voice over NR (VoNR) are implemented in the UE, or in the case of temporary lack of radio resources in 5G. EPSFB is an additional mobility trigger for improving voice key performance indicators (KPIs). EPSFB enables devices to use the 5G core with NR, but the RAN may trigger moving the device to LTE during call establishment. Reasons for this could include a lack of 5G radio resources, the UE being in an area where 5G is not dimensioned and tuned for voice services, or the UE not having all needed voice features for VoNR.

When EPSFB occurs, the UE is passed from, for example, 5G to LTE. Typically, all UEs are assigned to the same layer, such as layer 1, of LTE without any analysis or dynamic determination as to which layer would be optimal for each UE. As such, even when there is congestion on layer 1, for example, all UEs experiencing EPSFB are still assigned to that layer. Therefore, currently, implementation of EPSFB is to hard-code which LTE layers the UE should fallback to based on pre-configured priorities. But, there is no consideration of the UE capabilities or historical data for optimized LTE layer assignment. For example, if UE-1 (low/mid-tier device with minimal band and carrier aggregation (CA) support) along with UE-2 (high-tier device with all band and CA combination support) are in EPSFB from NR to LTE due to a voice call, the current implementation would be to redirect both UEs to a pre-defined LTE layer without considering its UE capabilities, resulting in a non-optimal utilization of resources and a non-optimal end user experience.

In aspects provided herein, in a network scenario of 5G standalone (SA)+LTE+non-VONR+voice EPS FB, mechanisms are discussed to dynamically optimize EPSFB based on UE capability and historical data in hybrid NR/LTE networks. In aspects, the nodes (e.g., eNodeB, gNodeB) monitor active EPSFB UE load across all LTE layers. If the EPSFB UE load on a certain layer becomes higher than an operator defined threshold, the node may then monitor EPSFB UE band capability information for devices on that layer. If any active dual-band capable UEs are identified, those UEs may be redirected to another non-loaded layer per defined priority. If the loaded layer is identified as a target FB layer for a UE, another non-loaded layer is assigned to that UE per defined priority.

A first aspect of the present disclosure is directed to a method for optimizing layer assignment during an EPS fallback procedure. The method comprises monitoring a UE load of one or more layers of a first wireless access technology, responsive to the UE load meeting a predetermined threshold, determining a layer capability associated with each of a plurality of UEs, and based on the layer capability associated with the each of the plurality of UEs, assigning to the each of the plurality of UEs a layer associated with the first wireless access technology.

A second aspect of the present disclosure is directed to a system for optimizing layer assignment during an EPS fallback procedure. The system comprises one or more processors and one or more computer storage hardware devices storing computer-usable instructions that, when used by the one or more processors, cause the one or more processors to perform steps. These steps comprise monitoring a UE load of one or more layers of a first wireless access technology, responsive to the UE load meeting a predetermined threshold, determine a layer capability associated with each of a plurality of UEs, and based on the layer capability associated with the each of the plurality of UEs, assign to the each of the plurality of UEs a layer associated with the first wireless access technology.

According to another aspect of the technology described herein, a method is provided for optimizing layer assignment during an EPS fallback procedure. The method comprises monitoring a UE load of one or more layers of a first wireless access technology, and responsive to the UE load meeting a predetermined threshold, analyzing historical data associated with each of a plurality of UEs that is associated with an EPS fallback procedure from a second wireless access technology to the first wireless access technology. The historical data indicates one or more of historical throughput needs or historical location information. Further, the method comprises, based on the analyzed historical data, determining a layer associated with the first wireless access technology for the EPS fallback procedure for the each of the plurality of UEs.

Throughout this disclosure, several acronyms and shorthand notations are used to aid the understanding of certain concepts pertaining to the associated system and services. These acronyms and shorthand notations are intended to help provide an easy methodology of communicating the ideas expressed herein and are not meant to limit the scope of aspects herein.

Embodiments herein may be embodied as, among other things: a method, system, or set of instructions embodied on one or more computer-readable media. Computer-readable media include both volatile and nonvolatile media, removable and nonremovable media, and contemplate media readable by a database, a switch, and various other network devices. Computer-readable media includes media implemented in any way for storing information. Examples of stored information include computer-useable instructions, data structures, program circuitry, and other data representations. Media examples include RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently. Embodiments may take the form of a hardware embodiment, or an embodiment combining software and hardware. Some embodiments may take the form of a computer-program product that includes computer-useable or computer-executable instructions embodied on one or more computer-readable media.

"Computer-readable media" may be any available media and may include volatile and nonvolatile media, as well as removable and non-removable media. By way of example, and not limitation, computer-readable media may include computer storage media and communication media.

"Computer storage media" may include, without limitation, volatile and nonvolatile media, as well as removable and non-removable media, implemented in any method or technology for storage of information, such as computer-readable instructions, data structures, program circuitry, or other data. In this regard, computer storage media may include, but is not limited to, Random-Access Memory (RAM), Read-Only Memory (ROM), Electrically Erasable Programmable Read-Only Memory (EEPROM), flash memory or other memory technology, CD-ROM, digital versatile disks (DVDs) or other optical disk storage, magnetic cassettes, magnetic tape, magnetic disk storage, or other magnetic storage devices, or any other medium which may be used to store the desired information and which may be accessed by the computing device 700 shown in FIG. 7. Computer storage media does not comprise a signal per se.

"Communication media" may include, without limitation, computer-readable instructions, data structures, program circuitry, or other data in a modulated data signal, such as a carrier wave or other transport mechanism, and may include any information delivery media. As used herein, the term "modulated data signal" refers to a signal that has one or more of its attributes set or changed in such a manner as to encode information in the signal. By way of example, and not limitation, communication media includes wired media such as a wired network or direct-wired connection, and wireless media such as acoustic, radio frequency (RF), infrared, and other wireless media. Combinations of any of the above also may be included within the scope of computer-readable media.

A "network" refers to a network comprised of wireless and wired components that provide wireless communications service coverage to one or more user equipment (UE). The network may comprise one or more base stations, one or more cell sites (i.e., managed by a base station), one or more cell towers (e.g., having an antenna) associated with each base station or cell site, a gateway, a backhaul server that connects two or more base stations, a database, a power supply, sensors, and other components not discussed herein, in various embodiments.

The terms "base station" and "cell site" may be used interchangeably herein to refer to a defined wireless communications coverage area (e.g., a geographic area) serviced by a base station. It will be understood that one base station may control one cell site or alternatively, one base station may control multiple cell sites. As discussed herein, a base station is deployed in the network to control and facilitate, via one or more antenna arrays, the broadcast, transmission, synchronization, and receipt of one or more wireless signals in order to communicate with, verify, authenticate, and provide wireless communications service coverage to one or more UE that request to join and/or are connected to a network.

An "access point" may refer to hardware, software, devices, or other components at a base station, cell site, and/or cell tower having an antenna, an antenna array, a radio, a transceiver, and/or a controller. Generally, an access point may communicate directly with user equipment according to one or more access technologies (e.g., 3G, 4G, LTE, 5G, mMIMO (massive multiple-input/multiple-output)) as discussed herein.

The terms "user equipment," "UE," and/or "user device" are used interchangeably to refer to a device employed by an end-user that communicates using a network. UE generally includes one or more antenna coupled to a radio for exchanging (e.g., transmitting and receiving) transmissions with a nearby base station, via an antenna array of the base station. In embodiments, UE may take on any variety of devices, such as a personal computer, a laptop computer, a tablet, a netbook, a mobile phone, a smart phone, a personal digital assistant, a wearable device, a fitness tracker, or any other device capable of communicating using one or more resources of the network. UE may include components such as software and hardware, a processor, a memory, a display component, a power supply or power source, a speaker, a touch-input component, a keyboard, and the like. In embodiments, some of the UE discussed herein may include current UE capable of using 5G and having backward compatibility with prior access technologies (e.g., Long-Term Evolution (LTE)), current UE capable of using 5G and lacking backward compatibility with prior access technologies, and legacy UE that is not capable of using 5G.

Additionally, it will be understood that terms such as "first," "second," and "third" are used herein for the purposes of clarity in distinguishing between elements or features, but the terms are not used herein to import, imply, or otherwise limit the relevance, importance, quantity, technological functions, sequence, order, and/or operations of any element or feature unless specifically and explicitly stated as such. Along similar lines, certain UE are described herein as being "priority" UE and non-priority UE, but it should be understood that in certain implementations UE may be distinguished from other UEs based on any other different or additional features or categorizations (e.g., computing capabilities, subscription type, and the like).

The terms "servicing" and "providing signal coverage," "providing network coverage," and "providing coverage," are interchangeably used to mean any (e.g., telecommunications) service(s) being provided to user devices. Moreover, "signal strength", "radio conditions," "level of coverage," and like, are interchangeably used herein to refer to a connection strength associated with a user device. For example, these terms may refer to radio conditions between a user device and a beam providing coverage to the user device. In particular, the "signal strength," "level of coverage," and like may be expressed in terms of synchronization signal (SS) measurements/values and/or channel state information (CSI) measurements/values. In the context of 5G, signal strength may be measured by user devices, which may communicate the signal strength to the cell site and/or the beam management system disclosed herein. In particular, a user device may report various measurements. For example, a user device may provide signal strength as certain synchronization signal (SS) measurements, such as a SS reference signal received power (SS-RSRP) value/measurement, a SS Reference Signal Received Quality (SS-RSRQ) value/measurement, a SS signal-to-noise and interference ratio (SS-SINR) value/measurement, and/or the like. Alternatively or additionally, in some embodiments, signal strength may also be measured and provided in terms of channel state information (CSI) values.

Turning now to FIG. 1, FIG. 1 depicts a diagram of an exemplary network environment 100 suitable for use in implementations of the present disclosure. Such a network environment is illustrated and designated generally as network environment 100. Network environment 100 is but one example of a suitable network environment and is not intended to suggest any limitation as to the scope of use or functionality of the invention. Neither should the network environment be interpreted as having any dependency or requirement relating to any one or combination of components illustrated.

Network environment 100 provides service to one or more user devices, such as exemplary UE 106. In some embodiments, the network environment 100 may be a telecommunication network (e.g., a telecommunication network such as, but not limited to, a wireless telecommunication network), or portion thereof. The network environment 100 may include one or more devices and components, such as base stations, servers, switches, relays, amplifiers, databases, nodes, etc. which are not shown so as to not confuse other aspects of the present disclosure. (Example components and devices are discussed below with respect to FIG. 5.) Those devices and components may provide connectivity in a variety of implementations. In addition, the network environment 100 may be utilized in a variety of manners, such as a single network, multiple networks, or as a network of networks, but, ultimately, is shown as simplified as possible to avoid the risk of confusing other aspects of the present disclosure.

The network environment 100 may include or otherwise may be accessible through nodes 102 and 104. Nodes 102 and 104 may include one or more antennas, base transmitter stations, radios, transmitter/receivers, digital signal processors, control electronics, GPS equipment, power cabinets or power supply, base stations, charging stations, and the like. In this manner, nodes 102 and 104 may provide a communication link between UE 106 and any other components, systems, equipment, and/or devices of the network environment 100 (e.g., the beam management system). The base station and/or a computing device (e.g., whether local or remote) associated with the base station may manage or otherwise control the operations of components of nodes 102 and 104. Example components that may control the operations of components of nodes 102 and 104 are discussed below with respect to FIG. 5.

Nodes 102 and 104 may include a Next Generation Node B (e.g., gNodeB or gNB) or any other suitable node structured to communicatively couple to the UE 106. Nodes 102 and 104 may correspond to one or more frequency bands. A frequency is the number of times per second that a radio wave completes a cycle. The frequency band may include a frequency range (e.g., a lower frequency and an upper frequency) within which the user device(s) may connect to the network environment such as, but not limited to, a telecommunication network or a portion thereof. The frequency range may be measured by the wavelength in the range or any other suitable wave properties.

In some embodiments, the UE 106 may take the form of a wireless or mobile device capable of communication via the network environment 100. For example, the UE 106 may take the form of a mobile device capable of communication via a telecommunication network such as, but not limited to, a wireless telecommunication network. In this regard, the UE 106 may be any mobile computing device that communicates by way of a network, for example, a 3G, CDMA, 4G, LTE, WiMAX, 5G, 6G or any other type of network. The network environment 100 may include any communication network providing voice and/or data service(s), such as, for example, a 1×circuit voice, a 3G network (e.g., Code Division Multiple Access (CDMA), CDMA 2000, WCDMA, Global System for Mobiles (GSM), Universal Mobile Telecommunications System (UMTS), a 4G network (LTE, Worldwide Interoperability for Microwave Access (WiMAX), High-Speed Downlink Packet Access (HSDPA)), a 5G network, or a 6G network.

In addition to UE 106 and nodes 102 and 104, network environment 100 includes communications links 108 and 110, data store 112, EPSFB Analyzer 114, and Layer Analyzer 116. In network environment 100, UE 106 may take on a variety of forms, such as a personal computer (PC), a user device, a smart phone, a smart watch, a laptop computer, a mobile phone, a mobile device, a tablet computer, a wearable computer, a personal digital assistant (PDA), a server, a CD player, an MP3 player, a global positioning system (GPS) device, a video player, a handheld communications device, a workstation, a router, a hotspot, and any combination of these delineated devices, or any other device (such as the computing device 500) that communicates via wireless communications with nodes 102 and 104 in order to interact with a public or private network.

In some implementations, nodes 102 and 104 are configured to communicate with user devices, such as UE 106 and other devices that are located within the geographical area, or cell, covered by the one or more antennas of nodes 102 and 104. Nodes 102 and 104 may include one or more base stations, nodes, base transmitter stations, radios, antennas, antenna arrays, power amplifiers, transmitters/receivers, digital signal processors, control electronics, GPS equipment, and the like. In one aspect, node 102 is an eNodeB, while node 104 is a gNodeB. In particular, UE 106 may communicate with nodes 102 and 104 according to any of one or more communication protocols, in order to access the network.

In aspects, UE 106 may be in communication with node 104, which is a 5G SA system, meaning that it provides 5G connectivity to UE 106 without the use of LTE, or node 102 as shown in FIG. 1. In the case of EPSFB, UE 106 may move from node 104 to node 102, where it will then be assigned to an LTE layer. Here, node 102 (or some other network component) may access data store 112 to determine a layer capability associated with UE 106. Layer capability may include a type of chipset included in UE 106, whether UE 106 is a low-end, mid-end, or high-end device, and/or which frequency bands UE 106 supports. This information can be used to determine if UE 106 can be assigned to layer 1, layer 2, etc. In addition to layer capability information, node 102 may also access data store 112 to get historical data associated with UE 106. For example, historical data may include location information, such as where the UE 106 has been at different times and on different days (and patterns associated therewith), data or throughput usage for UE 106, cellular v. non-cellular connections (and patterns associated therewith), etc. EPSFB Analyzer 114 may then use this information to analyze whether a UE is a candidate for EPSFB and which layers may be congested. Layer Analyzer 116 determines, for each UE, which layer is optimized based on one or more of layer capability information and historical data.

Having described the network environment 100 and components operating therein, it will be understood by a person having ordinary skill in the art that the network environment 100 is but one example of a suitable network and is not intended to limit the scope of use or functionality of aspects described herein. Similarly, the network environment 100 should not be interpreted as imputing any dependency and/or any requirements with regard to each component and combination(s) of components illustrated in FIG. 1. It will be appreciated by a person having ordinary skill in the art that the number, interactions, and physical location of components illustrated in FIG. 1 are examples, as other methods, hardware, software, components, and devices for establishing one or more communication links between the various components may be utilized in implementations of the present disclosure. It will be understood to a person having ordinary skill in the art that the components may be connected in various manners, hardwired or wireless, and may use intermediary components that have been omitted or not included in FIG. 1 for simplicity's sake. As such, the absence of components from FIG. 1 should not be interpreted as limiting the present invention to exclude additional components and combination(s) of components. Moreover, though components may be represented as singular components or may be represented in a particular quantity in FIG. 1, it will be appreciated that some aspects may include a plurality of devices and/or components such that FIG. 1 should not be considered as limiting the quantity of any device and/or component.

Figure 2:
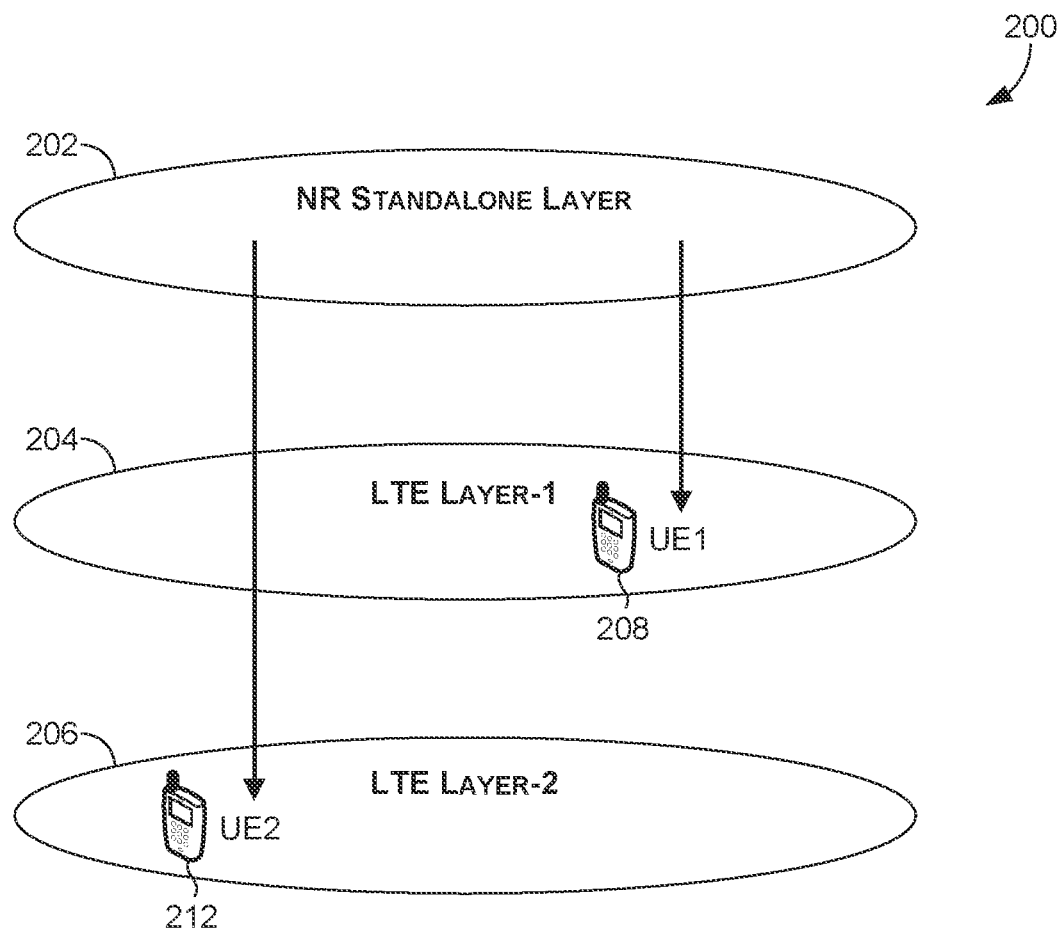
FIG. 2 depicts a diagram illustrating layer assignment during EPS fallback, according to various aspects herein.

FIG. 2 illustrates a diagram 200 of EPSFB from an NR standalone layer 202 to LTE layer 1 204 or LTE layer 2 206. As described with respect to FIG. 1, a UE, such as UE1 208 and UE2 210 as shown here may be experiencing EPSFB from NR standalone layer 202 to LTE layer 1 204 or LTE layer 2 206. Before being assigned an LTE layer, the network, such as the eNodeB or gNodeB may look at layer capability information and historical information associated with the UEs. Here, UE1 208 is assigned to move to LTE layer 1 204 while UE2 210 is assigned to move to LTE layer 2 206. UE1 208, for example, could be a low-end device only supporting band 41 and high band frequencies, while UE2 210 may be a higher-end device that supports millimeter wave (mm wave) and low band frequencies. Alternatively or additionally, UE1 208 may be a low throughput user, typically using Wi-Fi instead of cellular, while UE2 210 may be a high cellular data user, using cellular most of the time, and needs the right carrier aggregation (CA) capabilities. Between the layer capabilities and historical data, UE1 208 may be assigned to LTE layer 1 204 and UE2 210 may be assigned to LTE layer 2 206.

Figure 3:
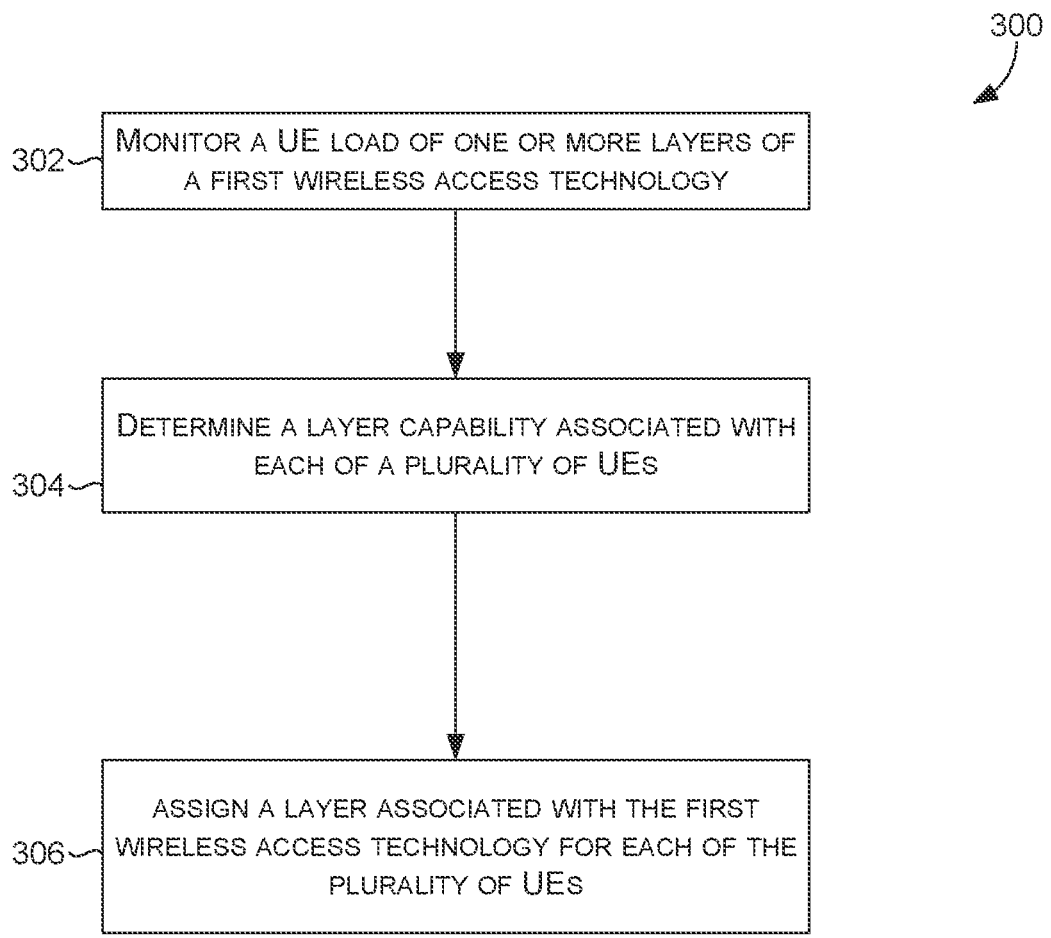
FIG. 3 depicts a flow diagram of an exemplary method for optimizing layer assignment during an EPS fallback procedure, in accordance with aspects herein.

Turning now to FIG. 3, a flowchart is provided of a method 300 for optimizing layer assignment during an EPS fallback procedure. Initially at block 302, a UE load of one or more layers of a first wireless access technology is monitored. A node, such as an eNodeB or a gNodeB may be monitoring the UE loads. In aspects, the UE load corresponds to a quantity of user devices on a particular layer of the wireless access technology, such as LTE, when compared to a threshold quantity of user devices on that particular layer. When the UE load on a particular load rises and gets close to the upper threshold, that layer may not be able to adequately serve UEs newly assigned to the layer. At block 304, responsive to the UE load meeting a predetermined threshold, a layer capability associated with each of the UEs is determined. At block 306, based on the layer capability associated with each of the UEs, a layer associated with the first wireless access technology is assigned to each of the UEs.

In some aspects, one or more of the UEs may already be on LTE, but the network may assigned that UE a different layer (e.g., from layer 1 to layer 2) so that the UE's layer is optimized. As such, if a UE is on layer 1, but it is determined, such as by using layer compatibility information and historical information, that the optimized layer for the UE would be layer 2, aspects provided herein would reassign the UE layer 2. Other aspects contemplate that a UE is on a 5G standalone network, and is going to experience EPSFB based on one or more of many factors. Here, the UE would be falling back from 5G SA to LTE. But, instead of blindly assigning the UE an LTE layer, or assigning all UEs to the same layer, aspects herein provide for an intelligent layer assignment for the UE based on layer compatibility and/or historical information. As described herein, each LTE layer may operate in a different bandwidth or a different frequency. Some UEs may not have the capability to operate at a first bandwidth, but can operate at a second bandwidth.

In further aspects, historical data may be analyzed. The historical data may comprise historical throughput needs, historical location information, etc. For instance, a certain UE may typically use cellular (e.g., not connect to WiFi) and may have high data usage. This UE may also have the capability to be assigned to an LTE layer that utilizes mmWave frequencies. In this case, it may be optimal to assign the UE to a second layer. For another example, a UE my typically be located in an office building most days during the week and typically connects to WiFi. When this UE experiences EPSFB, that UE may be assigned to a layer that is more congested than other layers, as the needs for that UE will be less than other UEs.

Figure 4:
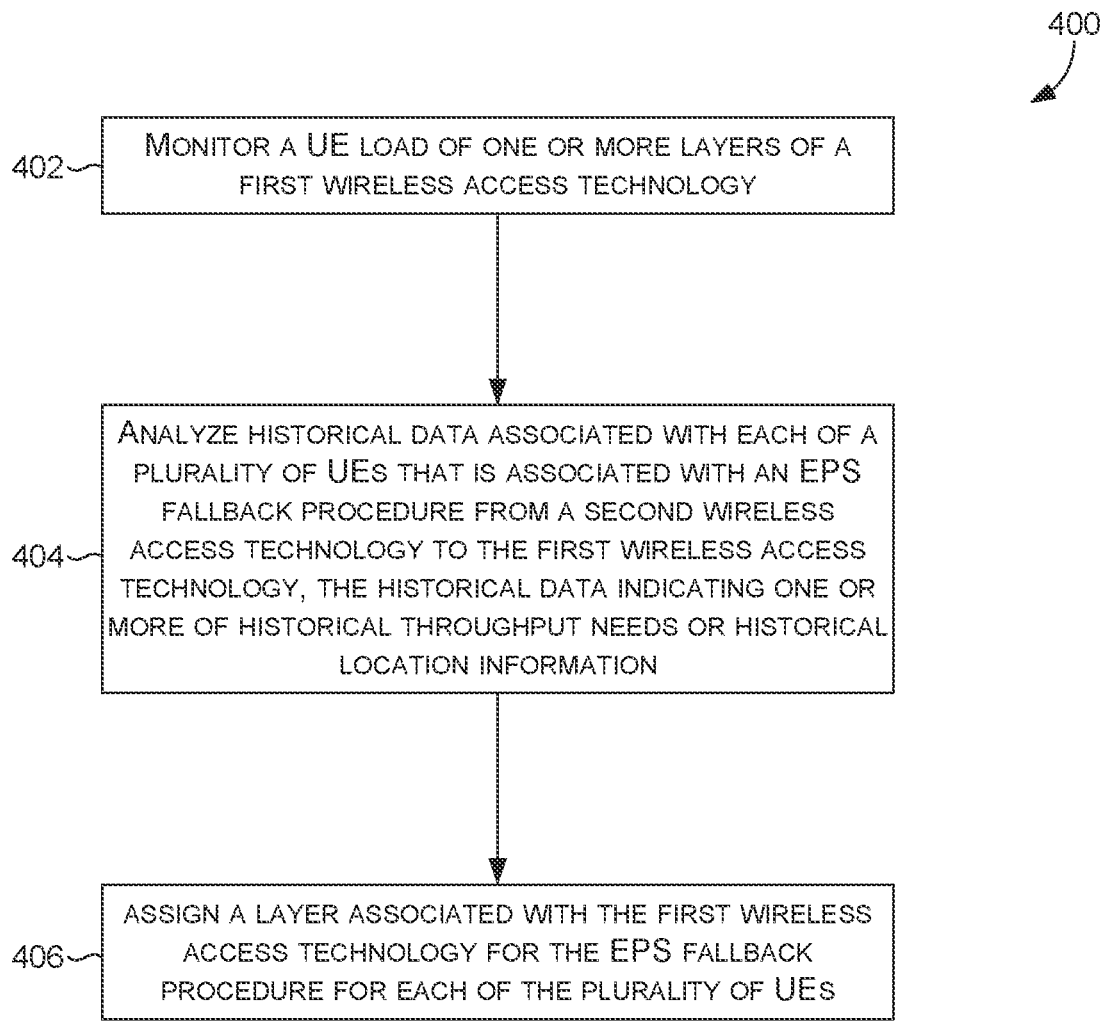
FIG. 4 depicts a flow diagram of an exemplary method for optimizing layer assignment during an EPS fallback procedure, in accordance with aspects herein.

Turning now to FIG. 4, a flowchart is provided of a method 400 for optimizing layer assignment during an EPS fallback procedure. At block 402, a UE load is monitored for one or more layers of a first wireless access technology, such as 4G/LTE. At block 404, responsive to the UE load meeting a predetermined threshold, historical data associated with the UEs that are associated with an EPS fallback procedure from a second wireless access technology to the first wireless access technology is analyzed. The historical data indicates historical throughput needs of the UEs and/or historical location information. In aspects, layer compatibility information may also be analyzed, and may be used to make the layer determination for each UE. At block 406, based on the analyzed historical data, a layer associated with the first wireless technology is determined for the EPS fallback procedure for each UE.

Figure 5:
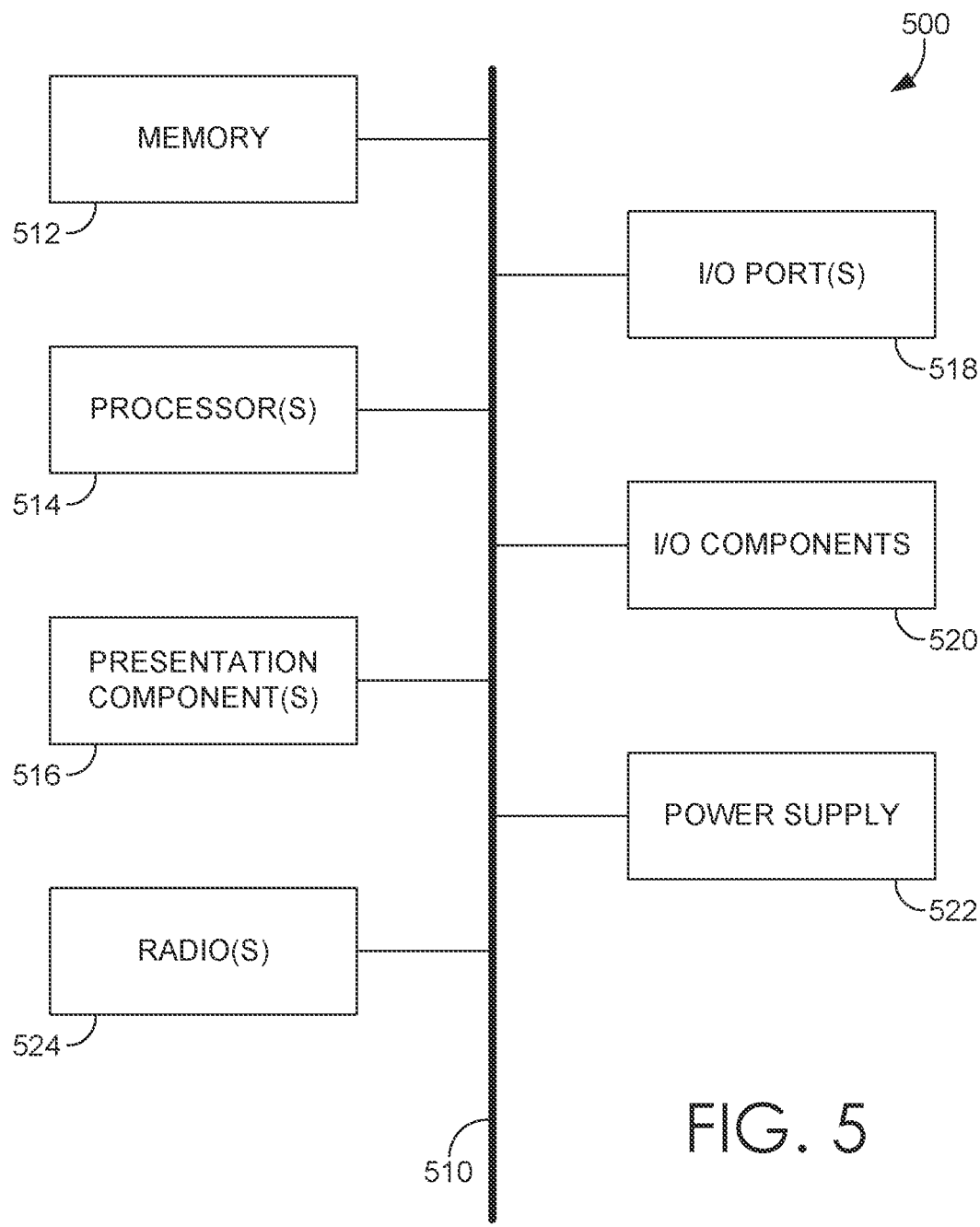
FIG. 5 depicts an exemplary computing environment suitable for use in implementations of the present disclosure.

Referring to FIG. 5, a diagram is depicted of an exemplary computing environment suitable for use in implementations of the present disclosure. In particular, the exemplary computer environment is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 5, computing device 500 includes bus 502 that directly or indirectly couples the following devices: memory 504, one or more processors 506, one or more presentation components 508, input/output (I/O) ports 510, I/O components 512, power supply 514, and radio 516. Bus 502 represents what may be one or more busses (such as an address bus, data bus, or combination thereof). Although the devices of FIG. 5 are shown with lines for the sake of clarity, in reality, delineating various components is not so clear, and metaphorically, the lines would more accurately be grey and fuzzy. For example, one may consider a presentation component such as a display device to be one of I/O components 512. Also, processors, such as one or more processors 506, have memory. The present disclosure hereof recognizes that such is the nature of the art, and reiterates that FIG. 5 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 5 and refer to "computer" or "computing device."

Computing device 500 typically includes a variety of computer-readable media. Computer-readable media can be any available media that can be accessed by computing device 800 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 504 includes computer-storage media in the form of volatile and/or nonvolatile memory. Memory 504 may be removable, nonremovable, or a combination thereof. Exemplary memory includes solid-state memory, hard drives, optical-disc drives, etc. Computing device 500 includes one or more processors 506 that read data from various entities such as bus 502, memory 504 or I/O components 512. One or more presentation components 8708 presents data indications to a person or other device. Exemplary one or more presentation components 508 include a display device, speaker, printing component, vibrating component, etc. I/O ports 510 allow computing device 500 to be logically coupled to other devices including I/O components 512, some of which may be built in computing device 500. Illustrative I/O components 512 include a microphone, joystick, game pad, satellite dish, scanner, printer, wireless device, etc.

Radio 516 represents a radio that facilitates communication with a wireless telecommunications network. Illustrative wireless telecommunications technologies include CDMA, GPRS, TDMA, GSM, and the like. Radio 516 might additionally or alternatively facilitate other types of wireless communications including Wi-Fi, WiMAX, LTE, or other VoIP communications. As can be appreciated, in various embodiments, radio 516 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

Many different arrangements of the various components depicted, as well as components not shown, are possible without departing from the scope of the claims below.

Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

The invention claimed is:

1. A method for optimizing layer assignment during an Evolved Packet System (EPS) fallback procedure, the method comprising:
monitoring a UE load of one or more layers of a first wireless access technology;
responsive to the UE load meeting a predetermined threshold,
analyzing historical data associated with each of a plurality of UEs that is associated with the EPS fallback procedure from a second wireless access technology to the first wireless access technology, the historical data indicating one or more of historical throughput needs or historical location information, and
determining a layer capability associated with the each of the plurality of UEs; and
based on the layer capability associated with the each of the plurality of UEs, assigning to the each of the plurality of UEs a layer associated with the first wireless access technology.

2. The method of claim 1, wherein the each of the plurality of UEs is associated with an EPS fallback procedure from a second wireless access technology to the first wireless access technology.

3. The method of claim 2, wherein the EPS fallback procedure comprises a UE moving from 5G to LTE.

4. The method of claim 1, wherein the each layer of the one or more layers operates in a different frequency band.

5. The method of claim 1, wherein the determining the layer associated with the first wireless access technology for the EPS fallback procedure for the each of the plurality of UEs is further based on the historical data associated with the each of the plurality of UEs.

6. The method of claim 1, wherein the UE load corresponds to a quantity of user devices on a particular layer of the first wireless access technology compared to a threshold quantity of the user devices on the particular layer of the first wireless access technology.

7. The method of claim 1, wherein the first wireless access technology is LTE, and wherein there are at least two layers.

8. The method of claim 1, further comprising determining that a first UE of the plurality of UEs has a capability of utilizing a first layer of the one or more layers but not a second layer of the one or more layers.

9. The method of claim 1, wherein based on the layer capability of the each of the plurality of UEs, assigning a first UE to a first layer of the one or more layers and a second UE to a second layer of the one or more layers.

10. A system for optimizing layer assignment during an Evolved Packet System (EPS) fallback procedure, the system comprising:
one or more processors; and
one or more computer storage hardware devices storing computer-usable instructions that, when used by the one or more processors, cause the one or more processors to:
monitor a UE load of one or more layers of a first wireless access technology;
responsive to the UE load meeting a predetermined threshold,
analyze historical data associated with each of a plurality of UEs that is associated with the EPS fallback procedure from a second wireless access technology to the first wireless access technology, the historical data indicating one or more of historical throughput needs or historical location information, and
determine a layer capability associated with the each of the plurality of UEs; and
based on the layer capability associated with the each of the plurality of UEs, assign to the each of the plurality of UEs a layer associated with the first wireless access technology.

11. The system of claim 10, wherein the each of the plurality of UEs is associated with an EPS fallback procedure from a second wireless access technology to the first wireless access technology.

12. The system of claim 10, wherein the each layer of the one or more layers operates in a different frequency band.

13. The system of claim 10, wherein the determining the layer associated with the first wireless access technology for the EPS fallback procedure for the each of the plurality of UEs is further based on the historical data associated with the each of the plurality of UEs.

14. A method for optimizing layer assignment during an Evolved Packet System (EPS) fallback procedure, the method comprising:
monitoring a UE load of one or more layers of a first wireless access technology;
responsive to the UE load meeting a predetermined threshold, analyzing historical data associated with each of a plurality of UEs that is associated with an EPS fallback procedure from a second wireless access technology to the first wireless access technology, the historical data indicating one or more of historical throughput needs or historical location information; and
based on the analyzed historical data, determining a layer associated with the first wireless access technology for the EPS fallback procedure for the each of the plurality of UEs.

15. The method of claim 14, further comprising determining a layer capability associated with each of a plurality of UEs.

16. The method of claim 15, wherein based on the layer capability of the each of the plurality of UEs, assigning a first UE to a first layer of the one or more layers and a second UE to a second layer of the one or more layers.

17. The method of claim 14, wherein the assigning to the each of the plurality of UEs a layer associated with the first wireless access technology is further based on the layer capability associated with the each of the plurality of UEs.

18. The method of claim 14, wherein the first wireless access technology is LTE and the second wireless access technology is 5G.

\* \* \* \* \*